No. 827,730. PATENTED AUG. 7, 1906.
A. T. JONES.
PROCESS OF DRYING FOODS.
APPLICATION FILED OCT. 22, 1900.
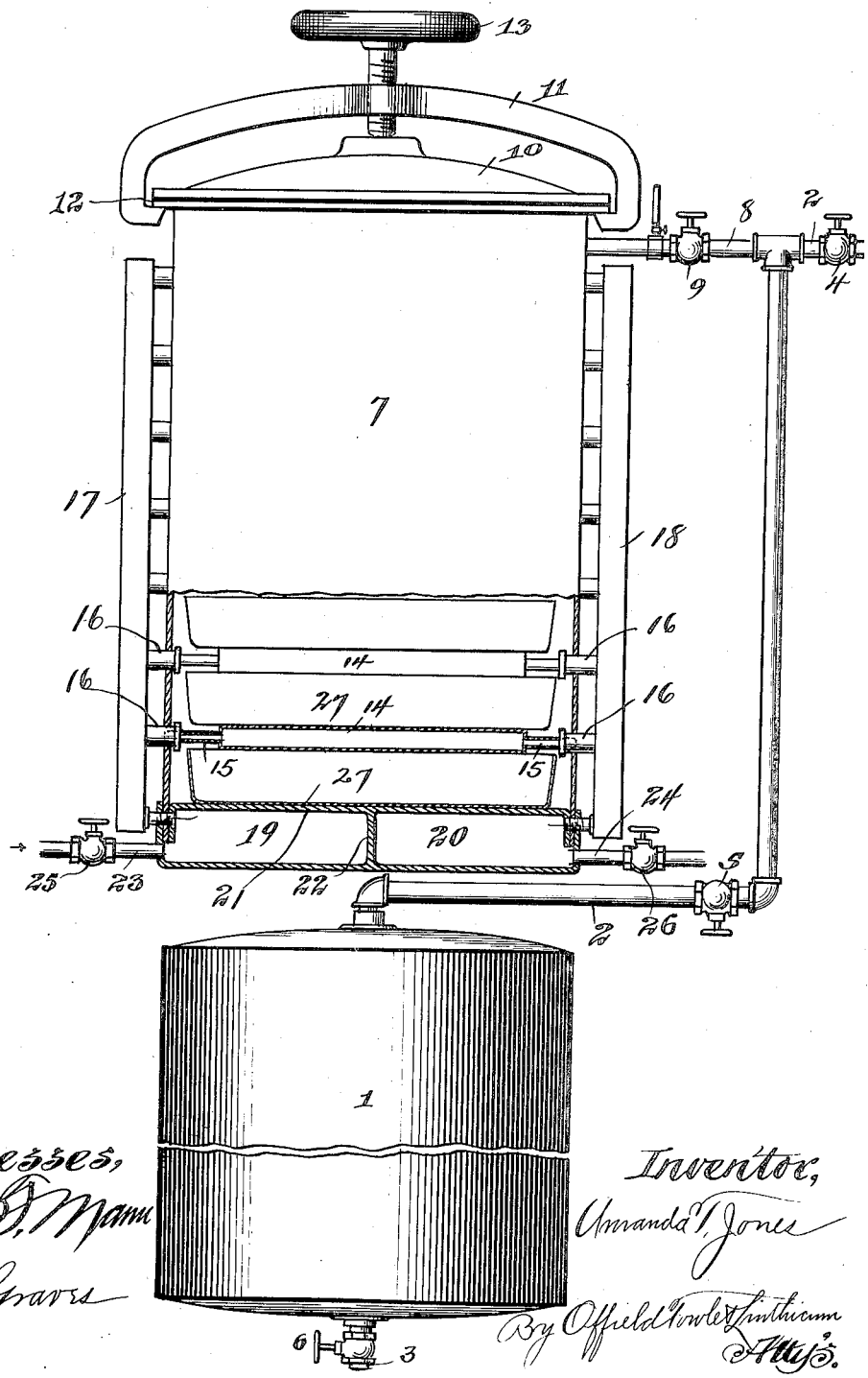
Witnesses,
Inventor,
Amanda T. Jones
By Offield Towle Linthicum
Attys.

UNITED STATES PATENT OFFICE.

AMANDA T. JONES, OF JUNCTION CITY, KANSAS.

PROCESS OF DRYING FOODS.

No. 827,730. Specification of Letters Patent. Patented Aug. 7, 1906.

Application filed October 22, 1900. Serial No. 33,919.

*To all whom it may concern:*

Be it known that I, AMANDA T. JONES, of Junction City, county of Geary, and State of Kansas, have invented certain new and useful Improvements in the Art of Preparing Food Products, of which the following is a specification.

This invention relates to an improved process for preparing food products, and refers more specifically to a process of drying or desiccating and sterilizing such products *in vacuo*.

The salient object of the invention is to provide an improved process whereby food products may be thoroughly and rapidly dried *in vacuo*, or in the absence of air, by means of a uniform and perfectly-controlled heat, thereby enabling the process to be carried out rapidly and at the same time without danger of overheating or burning and making it practicable to retain all or substantially all of the delicate natural flavors of the product being treated and to avoid discoloration and other objectionable features incident to drying in the presence of air or chemically-charged vapors.

The invention consists in the matters hereinafter described and more particularly pointed out in the appended claim, and will be readily understood from the following description, reference being had to the accompanying drawing, forming a part of said description.

In carrying out my improved process I first comminute the product, if it be relatively large in its natural condition, so that it may be arranged in relatively thin layers or bodies—say from two to five inches in depth—and I inclose the product to be treated in a hermetical inclosure and then proceed to withdraw the air therefrom, so as to produce a relatively perfect vacuum, such as would be indicated by twenty-nine inches or upward on the vacuum-gage. Having secured the proper vacuum, I submit the product to the action of a moderate heat by direct conduction from a heated body brought into actual contact with the layers of product being treated and continue the application of heat in this manner until the product has been completely discharged of moisture. In the case of treating such fruits and other products as contain a relatively large quantity of liquid initially I renew the vacuum from time to time during the carrying out of the drying process in order to discharge from the hermetical inclosure the vapors driven off by the drying process. In the case, however, of such products as contain little moisture initially I may complete the process without the necessity of renewing the vacuum during its progress.

The carrying out of my process will be readily and more clearly understood by description of the same as performed in conjunction with the use of an apparatus which I have devised for this purpose.

Referring to the single figure of the drawing, in which I have shown, partially in side elevation and partially in axial section, an apparatus adapted for carrying out my invention, 1 designates as a whole a closed vessel, which for convenience of description I will term an "exhauster," adapted to be charged with steam and provided with suitable inlet and outlet pipes 2 3, respectively, severally controlled by valves 4, 5, and 6.

7 designates as a whole a second closed vessel, which for convenience I will designate a "keeper," which is adapted to be thrown into connection with the exhauster by means of a pipe 8, communicating with the upper portion of the keeper and with the supply-pipe 2 of the exhauster and provided with a controlling-valve 9, whereby communication between the exhauster and keeper may be closed or established at will. The keeper is the vessel within which the product is subjected to the drying process, and to this end its upper end 10 is made removable and is held in position to form a hermetically-sealed joint by means of a clamping-yoke 11, having its ends engaged with an overhanging valve 12 upon the body of the keeper and supporting a handscrew 13, threaded therethrough and arranged to impinge upon its inner end upon the center of the inclosure, as indicated clearly in the drawings, it being understood that a suitable packing will be interposed between the meeting edges of the members of the keeper.

In order to provide means for applying heat by direct conduction to the product within the keeper, the latter is provided with a plurality of hollow horizontally-arranged supports or shelves 14, arranged at intervals apart throughout the height of the keeper, which supports are provided at opposite points with nipples or pipe connections 15, which severally connect and communicate with short branches or stub-pipes 16, extending through the side wall of the keeper and communicating with vertically-arranged risers 17 18, arranged at the opposite sides of the keeper. The risers 17 and 18 communicate at their lower ends with chambers 19 and 20, formed in the lower end of the keeper by means of a horizontal partition 21 and a dividing partition 22, and with these chambers 19 and 20 communicate supply and discharge pipes 23 and 24, respectively. The pipes 23 and 24 are severally provided with controlling-valves 25 and 26, and it will be obvious that by means of the construction described a heating medium, such as hot water or steam, may be caused to circulate through all of the hollow shelves or supports 14, it being obvious that a heating fluid introduced to the chamber 19 through the supply-pipe 23 will rise within the riser 17 and from this pass through the several hollow shelves within the keeper and descending by the riser 18 enter the chamber 20 and escape from the latter through the discharge-pipe 24.

In order to facilitate the placing of the product within the keeper and its removal therefrom, the several hollow shelves 14 are connected with the stub-pipes 16 by means of slip-joints, so that by shifting the shelf laterally so as to telescope its nipple farther within one branch or the other of the two supporting it the opposite nipple will be drawn out of connection, and then by shifting it back in the opposite direction the second nipple may be disengaged in a well-understood manner. Any other form of readily-disconnectible joint may obviously be employed in place of the slip-joint referred to.

Upon the several shelves 14 and also upon the bottom of the keeper-chamber, which is formed by the upper wall 21 of the chambers 19 and 20, are arranged shallow drying-pans 27, each desirably of a depth approximately equal to the space intervening between said hollow supports and adapted to contain the product to be treated. In charging the keeper with the product to be treated care is taken to fill these pans full enough so that the upper surface of the product will rest in direct contact with the overlying shelf or support 14, as well as resting in contact with the bottom of the pan, which itself rests directly upon the superjacent support. By means of this arrangement it will be obvious that the heat is simultaneously applied by direct conduction to both the upper and lower surfaces of the body of the product contained within each pan.

In carrying out my process by the use of the above-described apparatus the product to be treated is arranged within the keeper in the manner hereinbefore described and the latter closed hermetically. The valve 9, controlling communication between the exhauster and the feed-pan keeper, is now closed and steam admitted to charge the exhauster through the supply-pipe 2, which it will be understood communicates with any suitable source of steam-supply. The valves controlling the inlet and outlet pipes of the exhauster are then closed and the exhauster is drenched or otherwise chilled so as to condense the steam therein and create a vacuum, after which the valve 9, controlling the communication between the exhauster and keeper, is opened and the keeper thereby partially exhausted. I repeat these steps of alternately charging the exhauster, condensing the steam, and allowing it to exhaust the keeper until a vacuum of the required degree of perfectness is secured. A suitable heating fluid is next circulated through the hollow supports and lower chambers of the keeper, preferably by introducing hot water through the supply-pipe 23, and I continue the application of heat in this manner until the drying process has been completed, or, in the case of drying fruits, fresh meats, or the like, which contain a relatively large quantity of liquid, until the vacuum-gage indicates that a considerable quantity of vapor exists within the keeper, whereupon I renew the vacuum by repeating the steps hereinbefore described in producing the initial vacuum, thus drawing off the vapor, and then continue the drying process as before. It may be necessary to thus renew the vacuum several times before the process is complete; but it will be understood that the apparatus is so manipulated that in no event can air obtain access to the product during the process, nor until the process is completed and the keeper opened for the removal of the product. It is also to be noted in this same connection that the temperature attained within the drying-chamber is never permitted to rise to the cooking-point, but, on the contrary, is maintained at a relatively low degree throughout the process, so as to insure the expulsion of the moisture with the least possible change in the product.

The process carried out as above described possesses numerous advantages and obviously enables me to attain the several objects of my invention in an expeditious and economical manner. In this connection it may be noted that my process carried out as described is not to be confused with certain processes heretofore proposed which contemplate the drying of products suspended in vacuum by the application of heat applied to the exterior of the inclosure; nor is it to be confused with a process wherein the product is cooked in the presence of a vapor and the process continued to subsequently dry the cooked product.

I claim as my invention—

The process of drying food products in separate batches which consists in distributing the product, in thin spaced-apart layers and reduced to comminuted form, within a hermetically-sealed chamber, then exhausting the air from said chamber to produce a high vacuum by repeatedly introducing steam and condensing it, then applying a relatively low dry heat by direct contact conduction to the layers of food while the food is still subject to said vacuum and repeating the exhausting process by condensing the steam from time to time as the vapors are given off from the food until the product is dried, substantially as described.

AMANDA T. JONES.

Witnesses:
 ALBERT H. GRAVES,
 FREDERICK C. GOODWIN.